Feb. 20, 1945.     T. R. SMITH     2,370,085
ROLL-STOP MECHANISM FOR WRINGERS
Original Filed Jan. 5, 1940     5 Sheets-Sheet 4
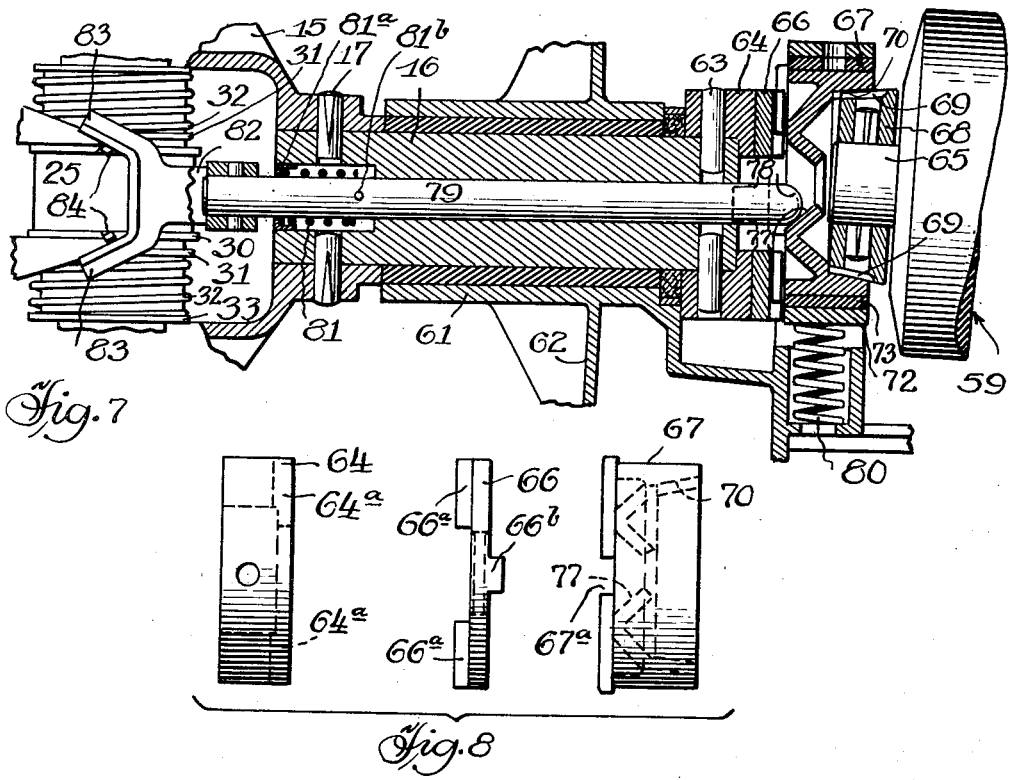
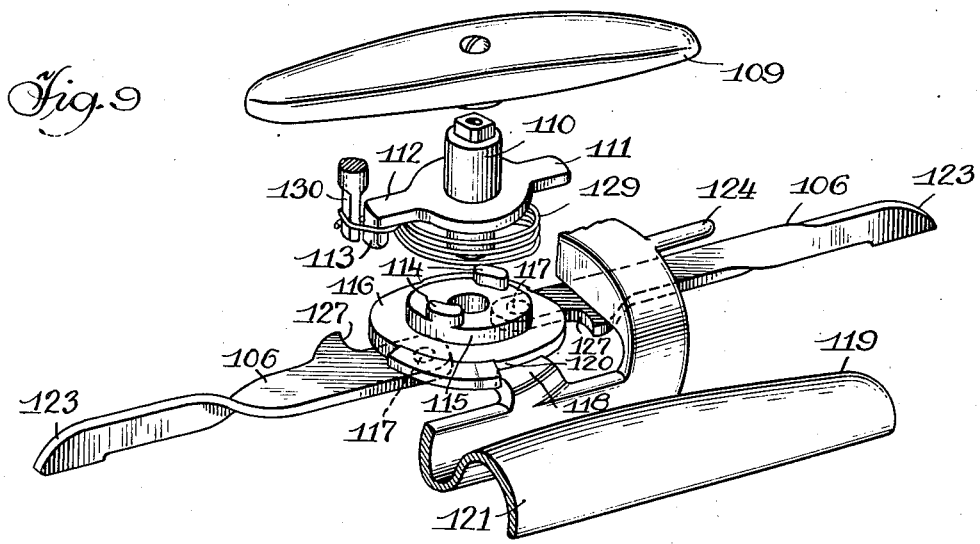
INVENTOR.
Thomas R. Smith,
BY Parkinson & Lauer
Attys.
Witness:

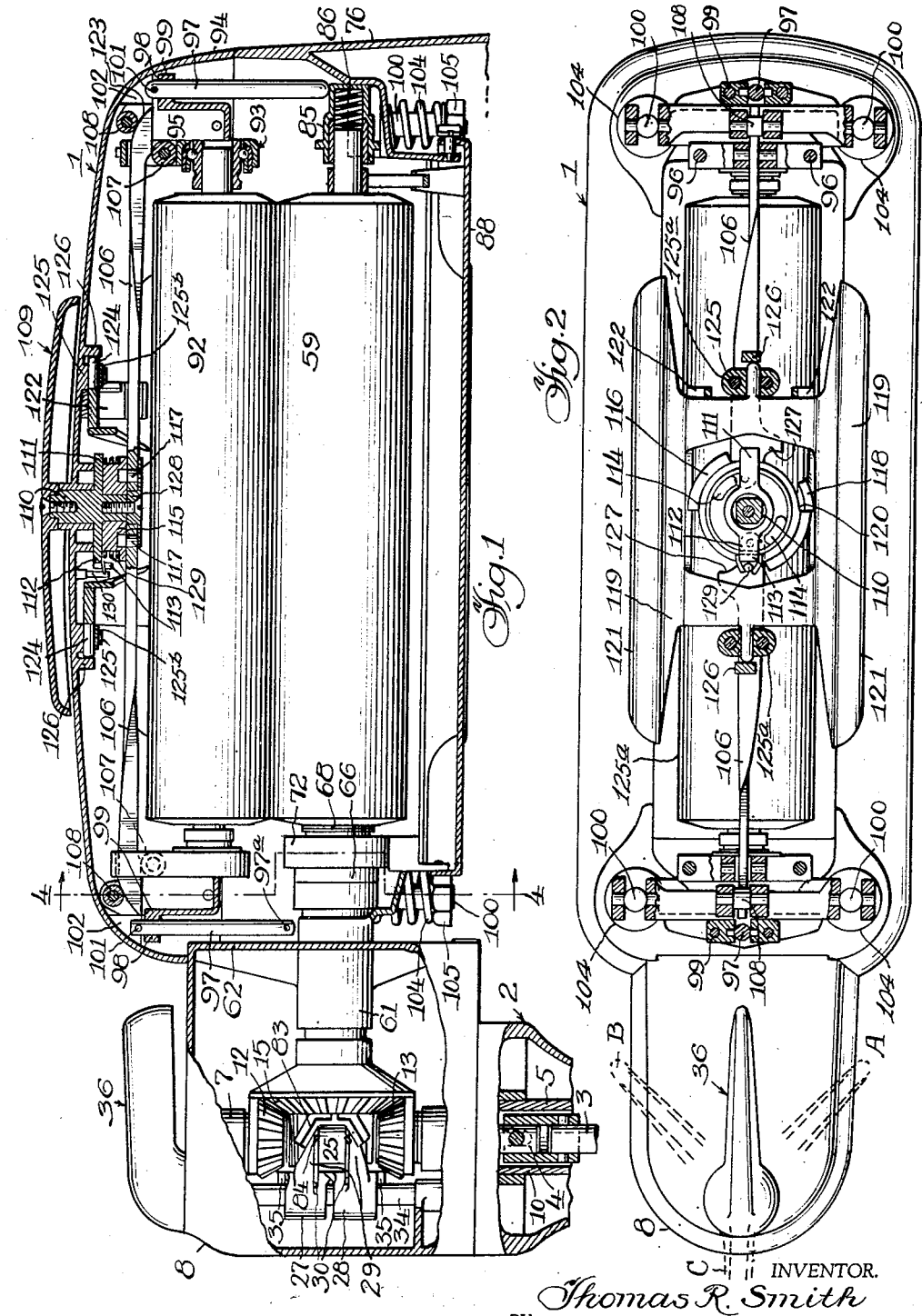

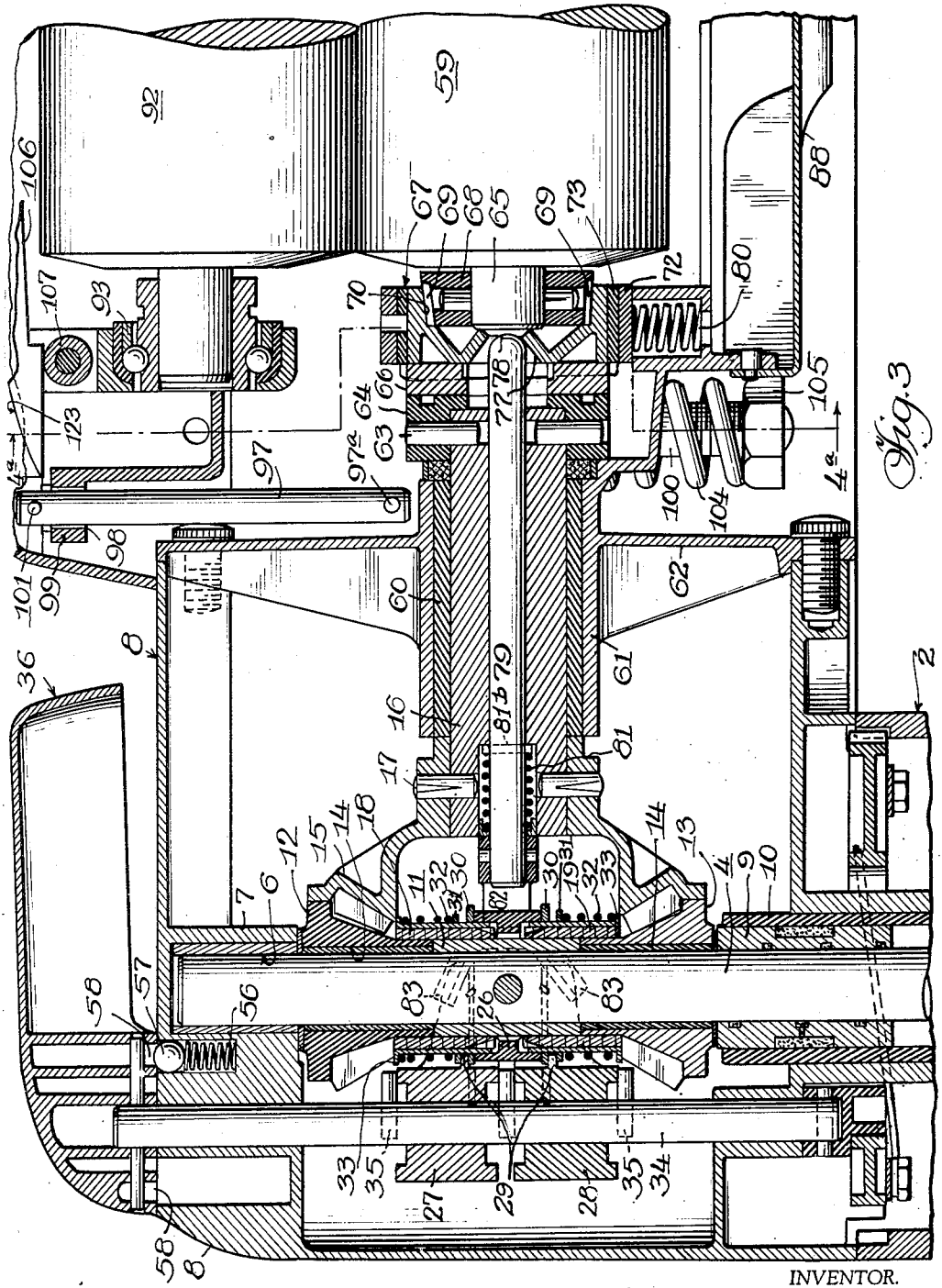

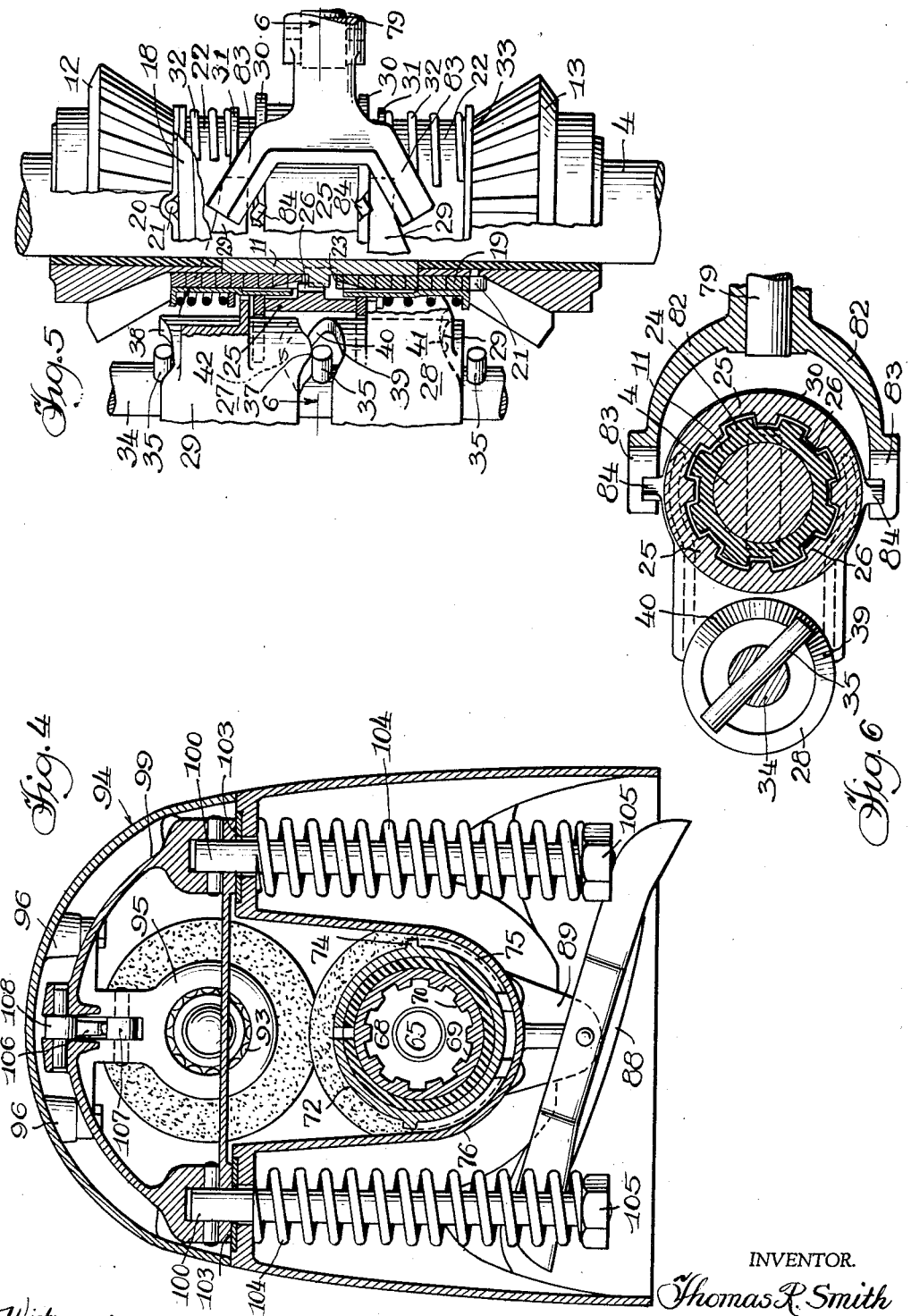

Feb. 20, 1945.  T. R. SMITH  2,370,085

ROLL-STOP MECHANISM FOR WRINGERS

Original Filed Jan. 5, 1940    5 Sheets-Sheet 5

INVENTOR.
BY Thomas R. Smith
Parkinson T Lane
Attys.

Witness:
Chas. R. Toursk.

Patented Feb. 20, 1945

2,370,085

UNITED STATES PATENT OFFICE 2,370,085

ROLL-STOP MECHANISM FOR WRINGERS

Thomas R. Smith, Newton, Iowa, assignor to The Maytag Company, Newton, Iowa, a corporation of Delaware Original application January 5, 1940, Serial No. 312,556. Divided and this application June 23, 1941, Serial No. 399,367

5 Claims. (Cl. 68—253)

The present invention relates to a wringer construction and more particularly to a novel means and mechanism for controlling the power drive to the wringer rolls whereby when pressure upon the rolls is relieved, rotation of the rolls is automatically and instantaneously stopped. The subject matter of this application is a division of my co-pending parent application Serial No. 312,556, filed January 5, 1940 and reference is also made to applicant's co-pending application Serial No. 399,368, filed June 23, 1941.

In the wringing operation, the usual procedure is for the housewife to successively wring the washed garments into one or more rinse tubs and from the rinse into a bluing tub, and thereafter into a basket or other receptacle prior to hanging the garments upon a line or rack to dry. In order that these successive operations may be quickly, conveniently and safely accomplished, the present novel construction embodies a power driven, swinging wringer in which the power drive is at all times under the positive control of the operator so that should an emergency arise, the pressure on the wringer rolls can be instantly relieved and the power instantly disconnected from the rolls, and cannot be reapplied until after the operator has manually reset the wringer.

The present invention provides a novel roll-stop mechanism so constructed and arranged as to automatically disconnect power from the driving roll the instant that the pressure between the rolls is released. This eliminates all possibility of injury that might result from the rotation of the driving roll even though pressure between the rolls is released.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while I have shown therein a preferred embodiment, it is to be understood that the same is susceptible of modification and change, and comprehends other details, arrangements of parts, features and constructions without departing from the spirit of the invention.

In the drawings:

Figure 1 is a view in vertical cross section through the complete wringer construction.

Figure 2 is a plan view of the wringer construction but with a substantial part of the wringer cap removed.

Figure 3 is a fragmentary enlarged view in vertical cross section taken longitudinally through the wringer drive mechanism and roll-stop.

Figure 4 is an enlarged view in vertical cross section taken in a plane represented by the lines 4—4 and 4ª—4ª of Figures 1 and 3, respectively.

Figure 5 is a fragmentary enlarged view, part in vertical cross section and part in side elevation, of the torque amplifier unit for clutching and de-clutching the wringer drive mechanism with the wringer rolls.

Figure 6 is a view in horizontal cross section taken on the line 6—6 of Figure 5.

Figure 7 is a fragmentary view, part in vertical cross section and part in side elevation, through the roll stop mechanism, as illustrated in Figure 3, but illustrating the parts in release position.

Figure 8 is a disassembled view of the parts making up the universal connection associated with the roll stop.

Figure 9 is a disassembled view in perspective of the quick release and reset mechanism.

Figure 10:
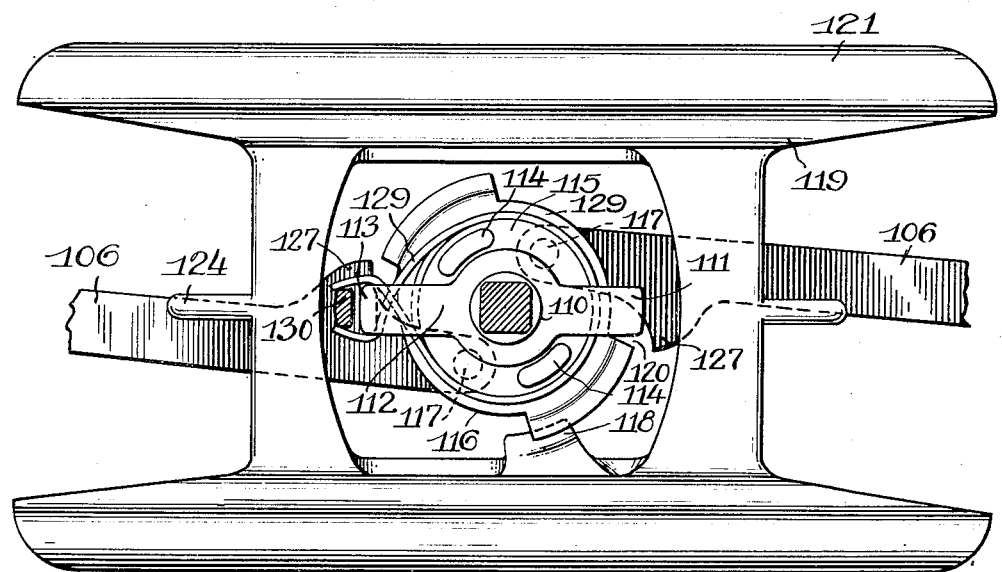
Figures 10 and 11 are fragmentary enlarged views of the quick release and reset mechanism for the wringer rolls in different stages of release.
Figure 11:
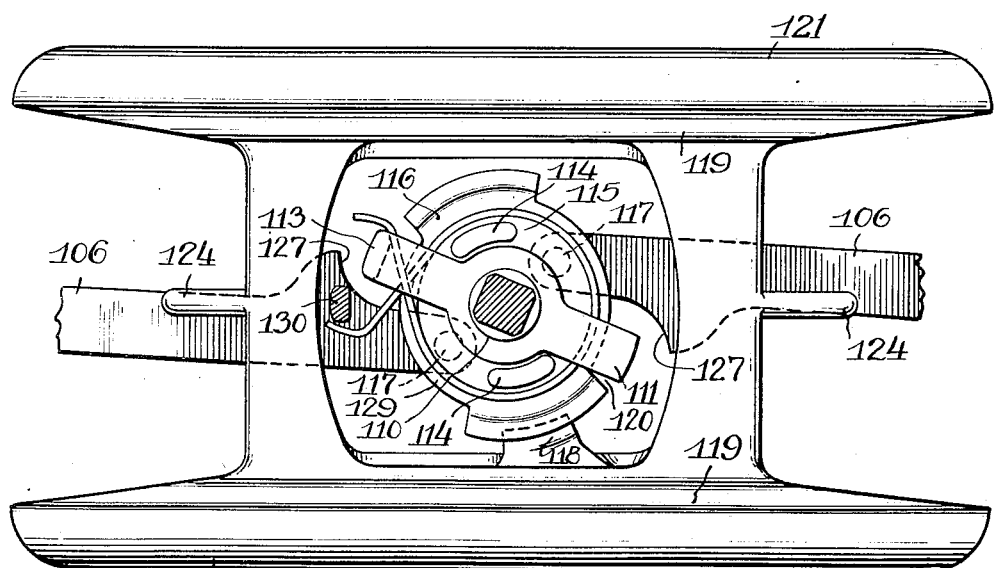

Referring motor particularly to Figures 1 and 2 of the drawings, the novel swinging wringer 1 is shown as rotatably mounted upon a wringer post or support 2 secured to and positioned at one side or corner of a washing machine tub. The wringer is adapted to swing in a complete circumference so that the operator, after the washing operation, may wring the garments into successive rinse and bluing tubs in a manner well known, and is readily removable from the post or support 2 upon which it is swingably mounted, should the occasion arise.

Power is supplied to the wringer by means of a vertical drive shaft 3 to which an aligned upper wringer shaft 4 is coupled at 5 when the wringer is mounted in operative position. As clearly shown in Figure 3, the upper shaft 4 is centered and rotatably mounted in an upper bearing 6 pressed into a boss 7 in the wringer gear housing 8, and a lower bushing 9 pressed into a tubing 10 for the wringer stem. A drive collar 11 is suitably pinned to the shaft 4 and opposed bevel gears or pinions 12 and 13, each shown as pressed upon a sleeve 14, are rotatably mounted upon this shaft and maintained in continuous meshing engagement with a large bevel gear or pinion 15 pinned to a roll drive shaft 16 by means of a groove pin or key 17.

As clearly shown in Figures 3 and 5, in order to clutch either of the opposed pinions 12 or 13 to the drive shaft 4, there is provided a novel clutching arrangement and torque amplifier unit including a pair of clutch springs 18 and 19, the upper drive spring 18 encompassing the hub of the pinion 12 with its upper end deformed to provide a raised loop at 20 and anchored to the pinion by means of a pin 21. This raised loop and pin seat between the ends of two adjacent teeth on the pinion 12 whereby the spring and pinion are held in solid engagement. The lower drive spring 19 is secured to the pinion 13 in a similar manner. Each spring is of coil construction, substantially rectangular in cross section and freely encompasses the drive collar 11 which is keyed to and rotates with the shaft 4, but each is held onto its respective pinion by an enclosing sleeve 22. This provides a pressed fit assembly so that each pinion, its respective clutch or drive spring and enclosing sleeve form a unit assembly. In neutral position, the right and left hand drive springs turn freely on the drive collar 11.

The inner or adjacent ends of the clutch or drive springs 18 and 19 are provided with spaced vertically extending notches 23 and the drive collar 11 is formed with external splines 24 adapted to mesh with and rotate a surrounding slidable drive sleeve 25 having internal splines 26, as shown more clearly in Figure 6 of the drawings. The drive sleeve is shifted up or down by means of a pair of spaced cams 27 and 28, each having a pair of projecting fingers 29 adapted to engage a collar or plate 30 loosely mounted at the opposite ends of the drive sleeve 25, and a washer 31 seated at the inner end of each coil spring 32, the opposite or outer end of these coil springs seating against an external flange 33 formed on the outer end of each enclosing sleeve 22.

The cams 27 and 28 are shifted up or down upon a rotatable shifter shaft 34 by means of spaced pins 35 secured in the shifter shaft to rotate therewith. The opposite faces or ends of these cams are so shaped or contoured that when the control handle 36, to which the shifter shaft is pinned, is rotated from its neutral position shown in full outline in Figure 2, in a clockwise direction through approximately 45° to the dotted line position A shown in this figure, the upper cam 27 is raised by the intermediate pin 35 engaging the projection or swell 37 on the lower face of this cam, and the uppermost pin seats in the depression or dwell 38 in the upper face. Raising of this cam 27 carries along its projecting fingers 29 which in turn raise the upper washer 31 and compress the upper coil spring 32. At the same time, this intermediate pin 35 is positioned directly above the dwell or depressed portion 39 of the upper face of the lower cam 28 so that the lower coil spring 32 expands and raises its washer 31, fingers 29 and cam 28, and these fingers raise the lower collar or plate 30 which in turn raises the drive sleeve 25 and forces its splines into meshing engagement with the notches 23 in the end of the clutch drive spring 18. This engagement with the drive spring causes the spring to wind up and grip the surface of the drive collar 11, causing the load to be transmitted from this drive collar to the spring and from the spring to the drive pinion 12, thereby causing rotation of the bevel gear 15 and roll drive shaft 16 in the direction as indicated by the shift.

In the same manner, rotation of the single control handle 36 to the dotted line position B (i. e. approximately 45° in a counter-clockwise direction from the neutral position shown in full lines in Figure 2) causes the intermediate pin 35 to engage the swell or projection 40 on the face of the lower cam 28 whereby to depress this cam, its fingers 29, washer 31 and the lower coil spring 32. In this position, the dwell or depression 41 in the lower face of the cam 28 is engaged by the lowermost pin 35 and the intermediate pin 35 is positioned directly below but spaced from the dwell or depression 42 in the lower cam face of the upper cam 27. In this position, the upper coil spring 32 expands and as the upper cam 27 is free to move downwardly, this spring depresses its washer 31, fingers 29 and upper cam 27, thereby forcing the shiftable, rotating drive sleeve 25 downwardly until its splines 26 mesh with the notches 23 in the lower drive or clutch spring 19. This engagement causes the clutch spring to wind up and grip the surface of the drive collar and thereby cause the load to be transferred from this drive collar to the spring 19 and from the spring to the drive pinion 13 so as to cause rotation of the bevel gear 15 and roll shaft 16 in the direction opposite to that above described.

In order that the swinging wringer may be latched or indexed in any desired position, the invention comprehends an indexing mechanism which permits the operator to swing the wringer through a complete circumference or through any desired angle or arc, and thereat positively lock the wringer solidly in position (see Figure 3). The wringer can be disengaged only when the shifter shaft and its control handle 36 are rotated through approximately 180° from the neutral position shown in full lines in Figure 2 to the dotted line position at C. It is, therefore, impossible for the wringer to be disengaged and in gear at the same time as the only positions in which the wringer is in gear are when the control handle is moved to a position approximately 45° in either direction from a central or neutral position, and when moved beyond that angle, the wringer is taken out of gear. This wringer indexing mechanism forms no part of the present invention, but is more fully disclosed in my parent application, Serial No. 312,556.

In order to hold or index the positions of the wringer control and shifter handle, the upper portion or head of the wringer gear housing 8 is provided with a coil spring 56 exerting pressure against an index ball 57 to force this ball into spaced notches or depressions 58 in the under surface of the control handle.

The lower wringer roll 59 is driven from the roll drive shaft 16 which is pinned or keyed at one end to the large bevel gear 15. This roll drive shaft rotates in a bushing 60 pressed in a bearing 61 formed in the end plate 62 of the gear housing. The other end of this shaft is pinned at 63 to a universal joint 64 connecting the shaft 16 through a universal arrangement to the shaft 65 of the lower wringer roll 59. This universal arrangement includes the universal joint 64 connected to the wringer shaft 16, slide 66 provided on one face with a pair of oppositely disposed splines 66ª and on the other face provided with a second pair of opposed splines 66ᵇ and universal joint 67 for the wringer roll end.

The member 64 is provided with opposed slots 64ᵃ adapted to receive the splines 66ᵃ and the universal joint 67 is provided with spaced recesses 67ᵃ for reception of the splines 66ᵇ on the opposite face of the slide 66 (see Figure 8). Associated with the universal joint 67 is a male member 68 keyed to the lower roll shaft 65 and provided with tapered external splines 69 adapted to mesh with complementary splines 70 in the universal joint or female member 67 carried in a bearing 72 having a bushing 73. This bearing is provided with projecting lugs 74 and annular ribs 75, the ribs seating in complementary guide channels formed in the cradle or pocket provided in the lower frame casting 76 and the lugs 74 forming stop members. The universal joint or female member 67 is formed with an annular, tapered cam surface 77 adapted to contact the rounded end 78 of a roll-stop plunger 79 whenever the wringer tension is released from the rolls.

As clearly shown in Figure 3, a coil spring 80 seats against the lower face of the bearing 72 for the universal joint for the wringer roll end, and when the wringer tension is released, this coil spring forces the bearing and the universal joint upwardly and the cam surface 77, abutting against the end 78 of the plunger 79, forces this plunger inwardly against the tension of the spring 81 seated between the stationary collar 81ᵃ and pin or abutment 81ᵇ on the plunger 79. This plunger is formed or provided at its inner end with bifurcations 82 (see Figure 6), the projections or arms 83 of which are so formed as to engage the ears 84 formed on the collars or plates 30, whenever the plunger is forced inwardly. This inward movement causes either arm or projection 83 to engage the ears 84 of one or the other of the collars 30, depending upon whichever one has been moved in the clutching operation, and to move this collar and the drive sleeve 25 to a neutral position, thereby disengaging whichever driving spring 18 or 19 is in clutching engagement. Thus the drive to the wringer rolls will be instantly disengaged, regardless of the position of the control handle or shifter cams.

The lower wringer roll is supported on the wringer head end in the bearing 72 for the universal joint 67, and on the outer end by means of a bearing 85 cradled in the pocket formed in the lower frame casting 76 (see Figure 1). In this bearing 85 is mounted a spring 86 for forcing the lower roll 59 into constant engagement between the splines 69 and 70 (Figure 3). The bearings for the lower roll are carried in the casting or wringer frame 76. Mounted below the lower roll shaft is a pivotally mounted drain plate 88 adapted to be tripped in the proper direction for draining the water away from the clothes as they pass through the wringer rolls. The mechanism for tripping this drain plate forms no part of the present invention.

The upper wringer roll 92 is carried in ball bearings 93 supported in the wringer cap 94 by means of bearing hangers 95 secured to spaced studs 96 depending from the underside of the wringer cap. This wringer cap is guided at each end by a guide rod 97 received in an opening 98 in the caps or supports 99 for the adjustably mounted tension bolts 100. These guide rods are pivotally mounted on and depend from a horizontal pin 101 mounted in wringer guide brackets or lugs 102 depending from the underside of the wringer cap at its extreme ends. To prevent the wringer cap from becoming completely separated from the wringer frame, one of the guide rods 97 is provided with a retaining pin 97ᵃ. Each cap or support 99 is held down against the shoulders or ledges 103 of the wringer frame 76 by means of springs 104 which exert their pressure upon each cap or support 99 through the tension bolts 100 by bearing at their upper end against the underside of the ledge or shoulder 103 and at their lower end against the nut 105. Each spring is held under compression, the amount of which may be adjusted by the nut 105. The upper wringer roll 92 is held in tension against the lower roll 59 by means of a pair of tension bars 106, the outer end of each riding on a roller 107 in the hanger 95 and being forced under a roller 108 which is rotatably mounted in each cap or support for the tension bolts, thereby applying the pressure exerted by the tension springs 104 to the upper roll, forcing it down against the lower roll. The tension bars 106 are forced outwardly between the rollers 107 and 108 by means of a tension reset handle 109 secured upon a shaft 110 rotatably in the wringer cap 94. This tension reset shaft 110 is provided with oppositely projecting arms 111 and 112, the latter having a downwardly projecting lug 113. These arms are adapted to engage with oppositely disposed lugs or projections 114 on the upper face of the hub 115 of a tension eccentric plate 116 carrying eccentric pins 117 on its underside, to which are pivotally mounted the inner ends of the tension bars 106. Thus rotation of the arms 111 and 112 will cause these arms to engage the lugs 114 on the hub 115 and rotate the tension eccentric plate 116 whereby to force the tension bars 106 outwardly. A washer 128 secured to the lower end of the shaft 110 retains the bars 106 upon the eccentric pins 117.

When the tension bars have been extended to the proper position for locking the rolls under pressure, an extension 118 on the wringer release lever 119 will engage with or seat in the slot 120 cut in the periphery of the eccentric plate 116 and hold the tension bars 106 in their extended positions until the release lever 119 is tripped by engagement with either of its tripping bars 121 and moved from its central position against the tension of a centering spring 122. This leaf spring 122 is mounted upon the underside of the wringer cap and functions to return the release lever to its central or set position after it has been tripped by the operator. Tripping the release lever 119 releases the tension eccentric plate and allows the tension bars 106 to be forced back and inwardly by the tension of the springs 104 acting through the rollers 108 against the cam surfaces 123 on the outer end of the tension bars 106. This release lever comprises a cradle-like structure pivotally mounted at 124 in spaced brackets 125 depending from the underside of the wringer cap 94 and held therein by bolts 125ᵃ and strap 125ᵇ. Stop lugs 126 are adapted to prevent longitudinal movement of the release lever.

The bars 106 are formed with arcuate shaped portions 127 which simultaneously engage the circumference of the upwardly projecting reduced hub or shank of the washer 128 secured to the end of the shaft 110, in order that the impact force resulting from the tension release may be absorbed by this washer so that no shock load is received on the shaft 110 and furthermore transmitted to other parts of the wringer mechanism. To accomplish this, the washer is fitted loosely on the shaft 110. These arcuate portions 127 also prevent the bars 106 from being retracted over center. So that the tension reset handle 109 is returned to its normal position lengthwise of the wringer cap 94, the invention comprehends a coil spring 129 encompassing the hub 115 and having its ends bent in such manner that one end will seat against and be carried by the lug or projection 113 as it is rotated in the resetting operation, and the other end seats against the stationary projection 130 depending from the under surface of the wringer cap. Thus, after the handle is rotated to put the wringer into tension, it will be automatically brought back to its normal position by the tension of this spring.

Having thus disclosed the invention, I claim:

1. In a wringer construction having a pair of pressure rolls, a roll drive shaft and a driven shaft, drive mechanism adapted to be shifted into neutral position in which the rolls are maintained stationary or into driving relation for rotating the rolls in either direction, a roll stop plunger slidable in said drive shaft and associated with the drive mechanism, and means for moving the plunger to shift the drive mechanism to neutral position and stop rotation of the rolls upon release of roll pressure.

2. In a wringer construction having a pair of pressure rolls, a roll drive shaft and a driven shaft, drive mechanism adapted to be shifted into neutral position in which the rolls are maintained stationary or into driving relation for rotating the rolls in either direction, a roll-stop plunger slidable in said drive shaft and associated with the drive mechanism, a universal coupling connecting the drive and driven shafts, cam surfaces on the plunger and coupling and tension means to cause engagement of the cam surfaces to move the plunger to shift the drive mechanism to neutral position and stop rotation of the rolls upon release of pressure.

3. In a wringer construction having an upper and a lower roll, tension means for applying pressure to the rolls, aligned roll drive and driven shafts, a coupling connecting these shafts, drive mechanism connected to the roll drive shaft, shiftable means for moving the drive mechanism into neutral position or into driving relation in which the roll drive and driven shafts are rotated in the direction desired by the operator, a spring-pressed plunger associated with the roll drive shaft, tension means and complementary cam surfaces on said plunger and coupling so constructed and arranged that upon release of the pressure upon the rolls, the tension means forces the cam surface on the coupling to engage the cam surface on the plunger and move the plunger to shift the drive mechanism to neutral position and stop rotation of the rolls.

4. In a power driven wringer construction having an upper and a lower pressure roll, tension means for applying pressure to the rolls when these rolls are in operative position, roll drive and driven shafts, a coupling connecting these shafts, gearing adapted to clutch the roll drive shaft to the power supply, a member associated with the roll drive shaft having an end adapted to be located adjacent the coupling, cam surfaces on said member and coupling, and tension means held under compression while the rolls are in operative position for elevating the end of the driven shaft carried by the coupling upon release of the pressure applied to the rolls, said member and coupling being so positioned and arranged that upon release of pressure, the cam surfaces engage and move said member to declutch the gearing and stop rotation of the rolls.

5. In a power driven wringer construction having an upper and a lower pressure roll, tension means for applying pressure to the rolls when these rolls are in operative position, roll drive and driven shafts, a coupling connecting these shafts, gearing adapted to clutch the roll drive shaft to the power supply, a spring-pressed plunger carried by the roll drive shaft, one end of said plunger being located adjacent the gearing and the other end adjacent the coupling, complementary cam surfaces on the coupling and the adjacent end of the plunger, and a spring adapted, upon release of pressure on the rolls, to elevate the end of the driven shaft, the associated coupling and the cam surface on the coupling and to cause this last mentioned cam surface to engage and force the plunger outwardly to declutch the gearing and stop rotation of the rolls.

THOMAS R. SMITH.